United States Patent
Feria et al.

(10) Patent No.: US 7,020,621 B1
(45) Date of Patent: Mar. 28, 2006

(54) METHOD FOR DETERMINING TOTAL COST OF OWNERSHIP

(75) Inventors: Joaquin Feria, Sophia Antipolis (FR); Stephen Nunn, Newbury (GB)

(73) Assignee: Accenture LLP, Palo Alto, CA (US)

( * ) Notice: Subject to any disclaimer, the term of this patent is extended or adjusted under 35 U.S.C. 154(b) by 329 days.

(21) Appl. No.: 09/680,902

(22) Filed: Oct. 6, 2000

Related U.S. Application Data

(60) Provisional application No. 60/158,259, filed on Oct. 6, 1999.

(51) Int. Cl.
*G06F 17/30* (2006.01)

(52) U.S. Cl. .................................. 705/10; 705/7; 705/1

(58) Field of Classification Search ................ 705/400, 705/8, 9, 10, 7, 11; 395/183
See application file for complete search history.

(56) References Cited

U.S. PATENT DOCUMENTS

| | | | | |
|---|---|---|---|---|
| 5,233,513 A | * | 8/1993 | Doyle | 705/7 |
| 5,485,574 A | | 1/1996 | Bolosky et al. | |
| 5,734,890 A | * | 3/1998 | Case et al. | 707/5 |
| 5,745,880 A | | 4/1998 | Strothmann | |
| 5,771,179 A | | 6/1998 | White et al. | |
| 5,793,632 A | | 8/1998 | Fad et al. | |
| 5,799,286 A | * | 8/1998 | Morgan et al. | 705/30 |
| 5,893,082 A | * | 4/1999 | McCormick | 705/400 |
| 5,960,417 A | | 9/1999 | Pan et al. | |
| 6,157,916 A | | 12/2000 | Hoffman | |
| 6,219,654 B1 | * | 4/2001 | Ruffin | 705/400 |
| 6,546,506 B1 | * | 4/2003 | Lewis | 714/38 |

FOREIGN PATENT DOCUMENTS

| | | |
|---|---|---|
| EP | 652 518 A1 | 10/1995 |
| JP | 407-182209 | 7/1995 |
| JP | 408-320855 | 12/1996 |

OTHER PUBLICATIONS

Rachlin, Robert, "Handbook of Budgeting", Wiley & Sons, 1999.*
Project Management, Kerzner, Harold, Van Nostrand Reinhold, 1995, Fifth Edition pp. 758-765.*
Software Engineering, Vrije Universiteit, Wiley & Sons, LTD, 2000.*
TCO Discovery Audit for XYZ Publishing Company, MorganDoyle, Jun. 1999.*
"TCO Analyst", Gartner Consulting, 1997.*
Coleman, Alden T., Lowering the Total Cost of Ownership TCO for the Desktop, University of Tennessee, Oct. 21, 1998.*
"Return On Investment and Total Cost Of Ownership", ON Technologies, Aug. 13, 1998.*
Burns, Louis J. "Adding Value, Not Cost" Financial Times. London: Apr. 12, 1999 (from Proquest).*
Hudgins-Bonafield, Christy. "The message about TCO". Information Week. Manhasset: Jun. 15, 1998 (from Proquest).*
"New GartnerGroup Report from Gartner Direct Aims to Reduct IT Total Cost of Ownership". Business Wire. New York: Feb. 4, 1999 (from Proquest).*

(Continued)

*Primary Examiner*—Susanna M. Diaz
*Assistant Examiner*—Johnna Stimpak
(74) *Attorney, Agent, or Firm*—Brinks Hofer Gilson & Lione

(57) ABSTRACT

A method for determining the total cost incurred per user of information technology (IT) in a distributed computing environment includes obtaining base costs and ongoing costs of an IT system and applying those costs to a series of metrics. The metrics are compared against benchmarks to evaluate and assess where cost efficiencies can be achieved.

18 Claims, 1 Drawing Sheet

OTHER PUBLICATIONS

"Ten Ways to Save Millions". Capacity Management Review. Naples: Nov. 1994 (from Proquest).*

Sircar, S. and Dave, D., "The relationship between benchmark tests and microcomputer price," *Communications of the ACM,* Mar. 1986, vol. 29, No. 3, pp. 212-217 (abstract only).

Takahashi, Y., "Network planning for transportation business," *Journal of the Institute of Electronics, Information and Communication Engineers,* Feb. 1993, vol. 76, No. 2, pp. 126-128 (abstract only).

PCT/US00/27618, International Search Report, dated Jan. 9, 2001.

Ryan, et al. "Netcentric computing," Auerbach, 1998.

Ryan, et al. "Practical Guide to Client Server Computing," Auerbach, 2d Ed., 1998.

* cited by examiner

METHOD FOR DETERMINING TOTAL COST OF OWNERSHIP

This application claims priority from a provisional application entitled "MODE/IT FRAMEWORK v1.0" (U.S. Provisional Application No. 60/158,259), filed Oct. 6, 1999, which is incorporated herein by refeence.

BACKGROUND

This invention generally relates to methods for calculating costs attributed to the use of computing equipment and services. In particular, this invention relates to the costs of providing and maintaining computing services and methods to analyze those costs.

The Total Cost of Ownership (TCO) is defined as the total, per-seat cost incurred across a technology organization through the provision of continuing computing services to its users. It has now become an important metric for Information Technology (IT) to its users and for the IT industry. Organizations can evaluate their TCO either by considering their overall budgets through a top-down or bottom up approach.

As many organizations are under pressure to reduce costs, including of course the TCO for Corporate Systems, vendors and industry observers have predicted various levels of cost savings associated with both technology (e.g., migration from client-server environments to net-centric environments) and process improvements. Unfortunately most of the time their cost-savings claims do not provide the necessary context for decision makers to evaluate them, because the source of savings are not fully specified and the costs associated with the migration from one environment to another are not considered. Therefore, there is a need for an improved method for determining the TCO that provides a detailed analysis for decision makers.

SUMMARY OF THE INVENTION

In one embodiment, the invention includes a method for determining the cost per user of an information technology system. The method includes obtaining base costs, ongoing direct costs, and ongoing indirect costs. The method further includes gathering information relating to user profiles and organizational characteristics. These costs and information are input into a computer program to determine the cost for each user.

In a second embodiment, the invention includes a method for analyzing the costs associated with supporting an information technology system. The method includes obtaining cost information and system characteristics. Appraisal metrics are calculated based on the cost information and system characteristics. The metrics may be compared against established benchmarks.

This invention defines both metrics used to measure the costs associated with distributed computing when performing a TCO analysis, as well as metrics used to evaluate the operations effectiveness and efficiency. Where possible, the metrics are referenced to IT organizational functions in order to define precisely potential added value.

One application of this invention is to provide a TCO framework aligned as far as possible with the Management of Distributed Environments (MODE) framework (an IT organizational framework commercially available from Anderson Consulting, L. L. P., Chicago, Ill., USA), so that the factors that contribute to the TCO can be clearly identified and that the "Gap Analysis" could be done according to the MODE functions, which would allow to better assess MODE's added value. Of course, this invention is not limited to being carried out with a MODE framework, but can be applied within other IT organizational frameworks.

Another useful aspect of this invention is a set of metrics that give a holistic view of the TCO. These metrics enable comparative studies and benchmarking, as well as assessing the impact of possible changes and determining improvement opportunities through MODE's best practices implementation.

DETAILED DESCRIPTION OF THE INVENTION

Figure 1:
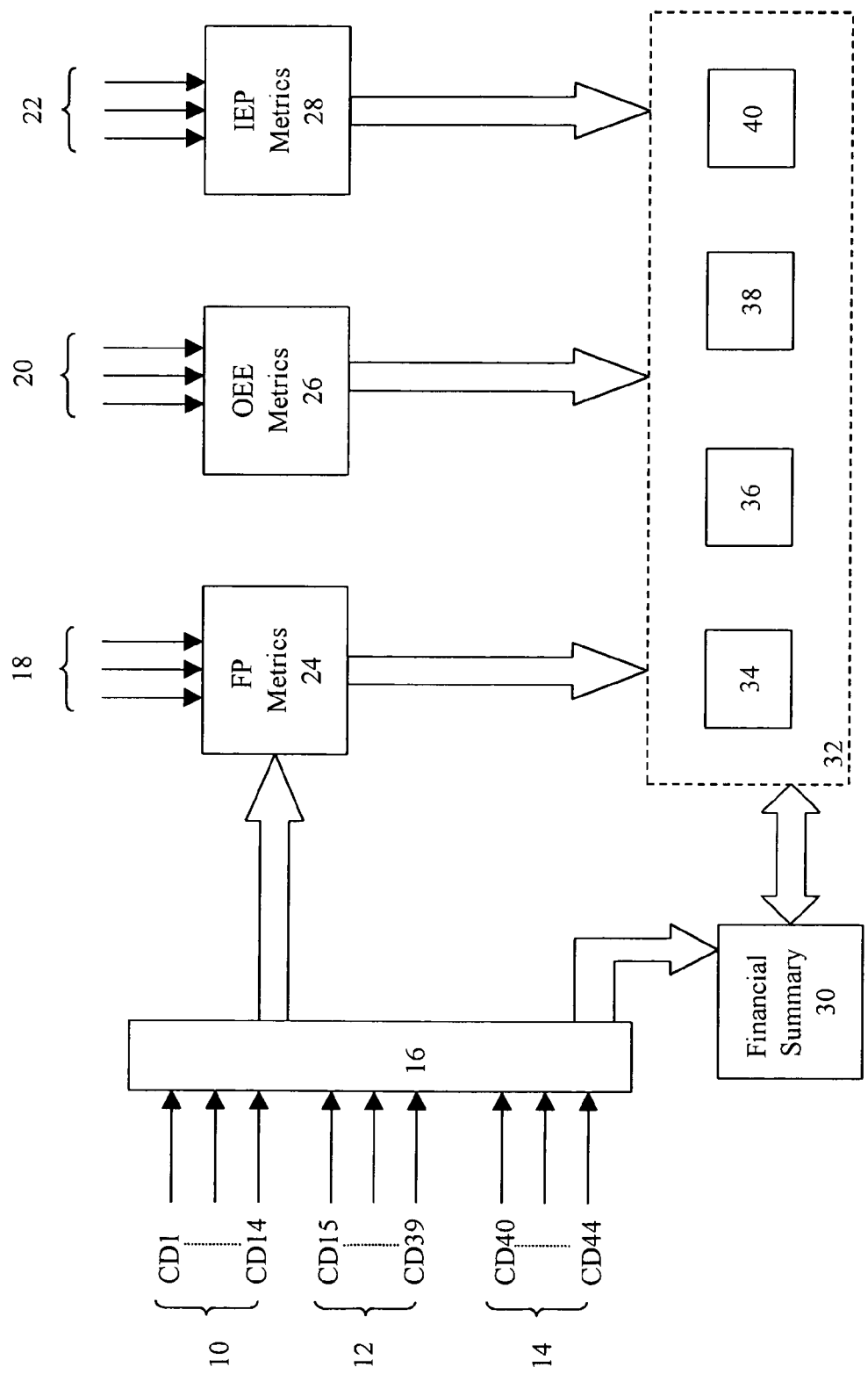
FIG. 1 shows a representation of one embodiment of the method of the present invention.

The TCO analysis becomes part of any Information Systems (IS) organization's continuous process of measurement, improvement and resource planning; it enables the simulation of improvement plans for asset changes, best practice implementation and complexity reductions.

In order to perform the TCO analysis, a methodology is used that requires both a financial chart of account and appraisal metrics relative to the distributed environment.

The initial step is to categorize the costs according to the MODE framework, or any other IT organizational framework implemented in an enterprise's IT systems. For illustration purposes, this invention is described in terms of the MODE framework. However, the costs may be categorized according to the IT framework which is described in co-pending application No. 09/685,162, entitled Organization of Information Technology Functions, by Dove et al., which was filed Oct. 6, 2000, which is herein incorporated by reference. Once the costs have been categorized, they have to be "standardized," i.e., put under a format that allows one to compare the data elements with others and do benchmarking to depict typical values for each data element and metric.

It is desirable to factor in key organizational and reference assumptions (e.g., company size, number of computers, etc.) when considering benchmarks, and try to point out all the factors of influence that impact the costs. Beyond asset and activity based costing, appraisal metrics will tally key staffing ratios, activity person hours, help desk performance metrics, and end user satisfaction metrics to provide the client with a complete perspective of its actual position and potential evolution.

Benchmarks are considered to carry out a consistent evaluation of an enterprise's position that also give insight to improvement initiatives. Actual and typical values for all the metrics and data elements, with all the relevant assumptions required to understand those values, are developed by experience in evaluating IT systems. The benchmarks are useful for an Opportunity/problem analysis.

Costs Categorization and Metrics Definition

In order to take into account the total costs associated with major investments and changes, BASE COSTS and ONGOING COSTS have been considered and have been adopted to categorize both one off investment and costs incurred through ongoing operations. Only the ONGOING COSTS will be aligned to the MODE framework, since MODE's added value principally lies in the potential changes that have to be made.

The BASE COSTS measure the one off costs of implementing the base System and Network Infrastructure. These costs consist of the planning costs (labor expenses), the acquisition costs (hardware and software purchase), which are typically Capital costs, and the installation costs (labor expenses).

The ONGOING COSTS measures the total amount of expense since the IT Infrastructure has been running. The costs are categorized as direct and indirect costs. The direct costs are the day-to-day operational costs such as maintenance, support, monitoring etc., whereas the indirect costs pertain to the unbudgeted costs that are caused either by downtime or end-user inefficiency at work. The Direct Costs, that refers to the Ongoing expenses of running IT operations, are hard factual costs, whereas the Indirect costs are often related as "soft" costs, because they are more subjective (i.e., it is difficult to measure them in a consistent way).

Obviously there are many factors that influence the costs related in the previous categories. Those TCO Drivers, like Enterprise profile (industry or business type, world-wide geographic location, enterprise size, end users type), Technology volume and type (servers, Client computers-mobiles+desktops-peripherals, network), Management Practices (Technology, Process, People), Complexity (IS organization, IS processes and service, end-user organization, hardware and software) are "tuning" the average typical values collected in benchmarking databases. These factors must be related as assumptions when comparing data in order not to come to wrong conclusions.

To avoid confusion and compare data more easily, often various parameters are gathered to compute a metric. Cost metrics can be derived straight forwardly from the costs elements, when associating the costs to another quantities (number of employees, number of desktops, etc.), which allows one to compare the TCO of various companies without having to make conversions.

Metrics are also helpful to provide the decision makers with a holistic view of the TCO. There are not only quantitative metrics, but also qualitative metrics, that examine the global performance of a company, and tend to determine its profile. Several appraisal metrics are defined that are categorized according to three different areas:

Financial perspective (FP)—This area looks at the organization in terms of its financial performance.

Ability to operate effectively and efficiently the IT Operations and Systems Infrastructure (OEE)—This area examines the system's performances.

Infrastructure and evolution perspective (IEP)—This area looks at the system's future and scalability.

For each metric developed, the appropriate MODE function is allocated, category referenced, the parameters described, how to compute it (construction and formula) and possibly its benchmark. Then the different relations that exist between all the appraisal metrics are detailed in order to make their interpretation easier and thus allowing to perform a better opportunity study.

The TCO metrics are aimed at not only reporting the costs of a distributed environment, but also give a holistic view of its components. The first step is to measure the costs, and then to see where they stem from, identify the factors of influence for each cost areas, the correlation between the metrics, and try to assess the impacts of change (management, technology) within the IT organization. The completion of this step will allow for assessment of opportunities against different scenarios.

One embodiment of the method of the present invention is represented in FIG. 1. In this embodiment, a series of cost data about a particular aspect of an information technology system is gathered. The cost data includes base costs (10), ongoing direct costs (12), and ongoing indirect costs (14), which are input into a cost data array (16). In addition, a series of user profile and IT organization characteristics are obtained. This information and characteristics are used for calculating a series of metrics. Financial characteristics (18) are obtained and input into the FP metrics array (24). Operating and efficiency characteristics (20) are input into an OEE metrics array (26). Infrstructure and evolution characteristics (22) are obtained and input into an IEP metrics array (28). Specific cost information from the cost data array (16) is input into the FP metrics array (24) and used for calculating certain FP metrics. From the cost data array (16), the data is used to calculate cost information which is used to generate a summary report (30) of the total cost of ownership. The cost data and the metrics are used to generate functional category detail reports and benchmark analyses (32). These reports and analyses break down the cost information and appraisal metrics according to the IT organizational functional categories to which that information corresponds. For example, under a MODE functional organization, the cost detail and appraisal metrics are broken out and provided in separate reports relating to service management (34), systems management (36), service planning (38), and managing of change (40). The definitions and formulas used to calculate these cost data and metrics are provided in the detailed description which follows. The formulas can be programmed on a computer, such as in a spreadsheet (e.g., Excel), to calculate the costs and metrics and display or printout reports.

Cost Categories

The cost categories are to be as precise and detailed as possible so that benchmarks from external data providers can be referenced. The costs are preferably evaluated on an annual basis, for the BASE costs as well as the ONGOING costs. Each time when necessary the life-cycle and depreciation of capital expenditures will have to be detailed and the global labor costs for a given time period annualized.

The costs are categorized as follows: Base costs include 1) Design; 2) Acquisition Costs; and 3) Installation Costs. Ongoing costs include 1) Direct Costs; 2) Systems management—aligned to MODE's System's Management Category; 3) Changes and upgrades—with many references to MODE's Managing Change Category; 4) Support—with references to MODE's Service Management Category; 5) Other Operational costs; 6) Indirect costs; 7) End User; and 8) Downtime.

Base Costs—Detail

The base costs are described in detail below. The base costs are identified by "Cost Data" designations CD1 through CD15 which are depicted in FIG. 1. Capital and Expense costs are distinguished, as they are most of the time accounted for separately in the chart of accounts of a company. There are only labor Expenses in the Design and Installation Costs section, whereas the Acquisition Costs section pertains to the Capital expenditures.

Design

"CD1" costs relates to systems research and planning. CD1 costs include the labor expenses for identifying infrastructure needs, operations architecture service quality, setting standards, defining organization and support requirements, considering configuration options, assessing scalability, predict TCO lifecycle, and plan rollout, (MODE functions: service planning).

"CD2" costs relates to vendor management. CD2 costs include the labor costs and other expenses (e.g., travel, etc.) for working with service vendors: IS labor time spent on meetings, workshops, writing RFPs, reviewing proposals and dealing with vendor issues. Another issue here is to include the Service Level Agreements (SLAs) and Operating Level Agreements (OLAs).

Acquisition Costs

This cost category refers to the hardware and software purchases. In order to compare these costs to industry averages, these costs are typically Capital Costs which are annualized, and we also have to consider the hardware value depreciation according to the life-time of the each component. Different Organizations may have different depreciation period dependent on fiscal accounting practices.

Included are all the material expenses for backup systems and systems management software. But no labor fees are accounted for in this category.

Hardware

"CD3" relates to end-stations acquisition. CD3 costs include the capital expenditures associated with the purchase of a computer (client, server, net-computer, dumb-terminal, laptop, etc.). This includes:

the basic configuration: CPU, monitor, mouse, keyboard, mothercard, memory, with possible bundles.

the peripherals: video/sound cards, floppy and CD-ROM drives the possible memory and storage upgrades (RAM+ROM) and devices for databases the network and communication devices: modem, network cards . . .

"CD4" costs relate to network hardware. CD4 costs include the capital expenditures for the network communication devices (hubs, bridges, routers, switches), cabling-depending on the transmission medium: optic fiber, coax etc.—and the connectivity devices: network cards (ATM, Ethernet, etc.), port adapters within the network communication devices.

"CD5" costs relate to operations and multimedia devices. CD5 costs include the capital expenditures associated with printers, scanners, and all the other multimedia devices (digital cameras, microphones, etc.).

"CD6" costs relate to operating system. CDT costs include the capital expenditures on operating system licenses. This cost is separated from the end-station acquisition cost, even if sometimes the operating system is already installed and there is a bundle price.

"CD7" costs relate to application software. CD7 costs include the capital expenditures for business and productivity software. This includes packages such as MS Office, financial and accounting software such as SAP, and all the software related to programming languages that help to build new applications (compilers, test tools, etc.).

"CD8" costs relate to groupware and communication software. CD8 costs include the capital expenditures on software used to connect users and enable sharing of information across the network. This includes: e-mail and other messaging software, Groupware (Lotus Notes, etc . . . ) and remote connectivity software.

"CD9" costs relate to systems management software. CD9 costs include the capital expenditures on security (virus protection and elimination), performance monitoring, production control (file transfer, backup and restore, storage) and failure control (fault detection and recovery) software. Enterprise Management software is included in this category, and can offer bundles for the previous systems management features.

"CD 10" costs relate to utility software. CD 10 costs include the capital expenditures for both multimedia software (videoconferencing tools), and end user utilities (screen savers, disk managers, PhotoShop, etc.) which are not productivity enhancing. Other entertainment software (audio and video tools) are included here.

Installation Costs

In the installation phase, it is expected that there will be no further material costs but only labor costs. Though these expenses will be both contracted labor costs and in-house labor costs.

After the installation phase is completed, the system is expected to be operational.

The following labor categories have been identified:

"CD11" costs relate to hardware set-up. CD11 costs include after labor expenses (internal+external) associated with the deployment of the network and system infrastructure: i.e., put the network devices and the workstations in place, pull down the cables and connect all the workstations to each other. There is also costs to setup the router according to the network topology and all the other network connectivity devices, depending on the protocols used.

"CD12" costs relate to operating system installation. CD12 costs include the labor costs (internal+external) associated with the installation of any operating system (UNIX, Windows NT/95, etc.).

"CD13" costs relate to application software. CD13 costs include the labor costs (internal+external) associated with the installation of all the applications related in the previous section.

"CD14" costs relate to groupware and communication software. CD14 costs include the labor costs (internal+external) associated with the installation and configuration of all the messaging software and the databases.

"CD15" costs relate to systems management software. CD15 costs include the labor costs associated (internal+external) with the installation of the network and systems management platform and the anti-virus systems.

Ongoing Costs—Detail

The ongoing costs are divided into two categories: the direct costs (CD16–CD39) and indirect costs (CD40–CD44). The direct costs are the budgeted costs to maintain and optimize the availability of key network resources, manage the system and implement the changes, and support the network users. The indirect costs are expenses that are not budgeted and often not accounted for in most of the IT organizations. These hidden costs make the true costs of IS systems underestimated, because the impact of downtime—which is a crucial factor increasing the overall costs—is too often not measured.

Direct Costs

Systems Management

As the overall planning phase of the systems management is assumed to be included in the "design" phase, this part of the labor is not taken into account as a whole here. Nevertheless for some areas an ongoing planning phase will be part of a systems management component.

The categories tend to match the MODE framework.

Production Control

"CD16" costs relate to application management. The annual labor expenses (internal+external) for ongoing management of applications including control and access management, print management and file transfer and control. These costs may include development costs.

"CD17" costs relate to storage management. The annual labor expenses (internal+external) for disk and file management (optimizing local and server on-line storage and file systems), data access management (providing user availability to information: database management, server file access and remote servers access), backup and archiving and repository management. These costs may include development costs.

"CD18" costs relate to traffic management. The annual labor expenses (internal+external) for pro-actively interpreting, planning and balancing the load placed on the network infrastructure.

Monitoring

"CD19" costs relate to event management. The annual labor expenses to log, classify and present event messages on consoles with pre-established filters or thresholds. In case of a fault, the message should be forwarded to those who can correct the fault and do a diagnosis.

"CD20" costs relate to performance management. The annual labor expenses for interpreting, planning and balancing the performance of servers, networked systems and applications.

"CD21" costs relate to physical site management. The annual labor expenses (internal+external) for routine tasks that are performed on a scheduled or interval basis to maintain the accessibility and performance of the whole system. This includes tasks such as routine cycling of applications and databases. The task operated is a kind of overall maintenance labor.

Security Management & Failure Control

In this section there are not only labor costs, but also maintenance contract costs.

"CD22" costs relate to security and virus protection. The annual labor costs and other expenses (development costs) for preventing from security violations; password management, access restriction, virus infection and recovering from such violations or intrusions should they occur.

Detection is tallied in the monitoring section.

"CD23" costs relate to LAN/WAN troubleshooting and repair. The annual expenses (internal+external) for technicians and administrators in identifying and resolving advanced support issues including failure, fault, and accessibility problems with the network, computers, printers, operating systems, and applications.

"CD24" costs relate to disaster planning and recovery. The annual labor expenses for restoring data, building disaster recovery and management plans including backup and restore procedures, record keeping and disaster recovery team organization.

"CD25" costs relate to hardware maintenance fees. The annual maintenance contracts fees. Generally agreed upon in SLAs, these contracts are carried out, monitored and recorded for each asset.

Changes and Upgrades

This cost area refers as well to the ongoing upgrades to the system as to the deeper changes that affect the whole system.

"CD26" costs relate to change planning. The annual costs associated with management of change planning. These costs are labor costs associated with the development of change control strategies and migration control (move from the development environment to the test and finally the production environment), and outsourced management fees such as strategic and tactical consulting.

"CD27" costs relate to asset management. The annual labor expenses for asset inventories (physical or automatic), asset identification and tracking, asset database management, change recording and/or managing automated asset management systems. Asset management is inventoried here because it is necessary to know what exists before implementing a change.

"CD28" costs relate to product evaluation and testing. The annual labor expenses for evaluation and testing of new technology materials (hardware, software) prior to purchase. Here are also accounted for the "vendor management" ongoing labor costs (see DESIGN section).

"CD29" costs relate to products procurement and implementation. The annual expenses for the purchase of new hardware and software, and the labor costs associated with their initial installation and configuration. Included here are the labor costs associated with software licensing and distribution, i.e., metering the number of available licenses and monitoring their usage (operating systems, applications, and connectivity software).

"CD30" costs relate to user administration (adds, moves and changes to users). The annual labor expenses for controlling user accessibility to network and application resources. Tasks include adding new users and resources, moving users to new groups, password management, or changing users profiles.

Support

The support costs are the direct labor expenses and fees associated with supporting the network's users.

"CD31" costs relate to help desk (Tier I support). The annual labor expenses for Tier I Help Desk support calls. The Tier I refers to the time spent by phone staff to answer calls and support End-Users without any intervention. Support Services performed at Tier II and III, that implies advanced troubleshooting and failure recovery are recorded in Systems Management.

"CD32" costs relate to request and problem management and planning. The annual labor costs associated with the coordination and control of all activities necessary to fulfill a request from either a user, vendor, or developer; and the prevention from recurring incidents to happen by determining the underlying problems causing these incidents, logging and archiving them. Included are also the labor costs associated with the design of the help desk, and the fees for legal counsel in planning and strategic consulting.

"CD33" costs relate to casual learning. The annual labor expenses of IS professional's time spent on independent, self-education and learning outside of formal training programs. Topics include self-education on computers, networks, printers, storage systems, network communication devices, as well as IS utilities and end-user applications.

"CD34" costs relate to training. The annual labor expenses and fees for develop, deliver training courses and train as well end users as IS personnel. This includes:

The labor time spend on training courses development (design, development, testing and maintaining IS and end-user courseware—incl. CBTs).

The labor expenses for delivering IS courses as well as the time spent by IS personnel in attending courses (both in-house and external courses).

The labor expenses for the delivery by trainers of end-user training courses, and the time spent by end-users on computer systems and all application training (incl. the initial training just after rollout).

"CD35" costs relate to operating costs. The annual fees for support tools (books, etc.) and travel. The travel expenses include as well the travel time to support remote branch offices, attend training sessions, visit vendors as the travel expenditures.

Operational Costs

This category pertains to the costs that are not associated either with maintenance, support, or changes. It is the last category associated with "hard costs," the other indirect costs being more subjective are often referred to as "soft" costs.

"CD36" costs are related to communications fees. The annual expenses for communication fees such as lease line fees, on-line access-fees, remote access services, WEB/ISP hosting fees, and allocated WAN fees.

"CD37" costs relate to leased asset fees. The annual fees for leased assets including, e.g., servers, printers, hubs, bridges, routers, switches, or client software.

"CD38" costs relate to IS commodity expenditures. The annualized capital fees for computer supplies such as floppy disks, CD-ROM disks, backup tapes, toner cartridges and other expendables.

"CD39" costs relate to insurance. The annual fees for insurance against theft, voltage shortage (implying data loss), etc.

Indirect Costs

The indirect costs are those that are not originally budgeted because they stem from a productivity loss due either to the end user themselves or to unplanned systems downtime. The majority of these metrics are sometimes difficult to measure. These costs are identified as CD40–CD44, as shown in FIG. 1.

End User

When end-users are diverted onto IT support oriented work, it results in a decrease of the global productivity of the company. For example, the higher the salary of an end-user is, the more important it is that they perform their core role and not spend time on self-learning and peer support. These costs are at best calculated estimates.

"CD40" costs relate to casual learning. The annual labor expenses of end users training themselves in lieu of formal raining programs. Time includes reading manuals, using on-line help, trial and error, and other self-learning methods. Costs can be higher for casual learning than formal learning: an inadequate formal training will result in high casual learning expenses.

"CD41" costs relate to peer and self support. The annual labor expenses for end users supporting themselves and each other instead of obtaining technical support from help desk or IS personnel. These tasks-repair, support, maintenance, installation, training—are performed extensively by end-users in remote offices not staffed by dedicated IS personnel or covered by support contracts.

"CD42" costs relate to Futz factor. The annual labor expenses associated with the development and customization of non-business applications (Notes scripts, etc.), the unnecessary changes to their computer or network settings (screen, file organization, folder, sounds, printers, etc.), and the time spent on playing games or web surfing.

Downtime

Downtime expenses are defined as a potential annual loss due to the unavailability of the IT Infrastructure due to faults, and its impact as measured as loss of productivity.

Most organizations lack accurate direct measurements of downtime, and even often do not track system reliability, therefore it is difficult to quantify the losses in terms of business revenues or productivity. Nevertheless, downtime causing lost productivity is considered.

Downtime can be either due to the waiting for a help desk problem to be resolved, to an infrastructure issue (planned maintenance), or unplanned failures (application bugs or inaccessibility, network outages, etc.), for example.

"CD43" costs relate to planned downtime. The annual productivity losses to end users from planned system maintenance, including downtime for backups or migrations of databases and optimizations.

"CD44" costs relate to unplanned downtime. The annual productivity losses to end users from unplanned outages of the network resources, including client computers, shared servers, printers, applications, communication resources, and connectivity. The unplanned network outages are almost always obtained from end user surveys.

Appraisal Metrics

The appraisal metrics are intended to be key performance indicators for IT operations as a measurement and assessment tool for the TCO, to evaluate and monitor its effectiveness. Different areas, divided into sections, have been distinguished to facilitate the comprehension and the use of all the metrics along the analysis. The comparison with available market data should allow then to elaborate best practices.

When computing the metrics, the parameters involved are preferably must be homogeneous, i.e., each parameter has to be measured within the same time period. The time period is taken to be equal to one year.

The metrics are categorized as follows:

Financial Perspective (FP): 1) Cost effectiveness; and 2) Budget management and repartition. Ability to operate effectively and efficiently the IT operations and Systems Infrastructure (OEE): 1) Quality; 2) Availability; and 3) Efficiency. Infrastructure and evolution perspective (IEP): 1) Adaptability; and 2) Future requirements and growth.

Metrics Template

In order to have standardized metrics, all the metrics are constructed according to the same template. This template defines the name of the metric and gives it a number, provides the MODE functions that are involved, indicates the parameters that are involved, how to compute them, the objective of each metric and additional comments.

Financial perspective (FP): The FP metrics look at the TCO in terms of its financial performance. To achieve this, ratios are computed for different cost metrics, and then organized by topic.

Cost Effectiveness

Budget Allocation

FP1-A: TCO Budget Ratio
  MODE function(s) or Category involved: SERVICE MANAGEMENT/Administration—Billing & Accounting
  Data Elements and Unit of Measurement: The TCO budget value (measure 1) . . . $; the total business budget value (measure 2) . . . $
  Formula: Measure 1/Measure 2*100%
  Metric objective and additional comments: This metric can be used to provide benchmarking and estimating guidelines for TCO and IT budgeting.

Here the business budget value considered is equal to the total costs of the entire business including operations and project costs. The larger this rate is, the more the company is technology-oriented or its network systems are meaningful to it (if there are many applications critical to business, the costs associated with the Corporate system will be higher since the network operations will have to be very effective).

Salaries

FP1-B. Average Corporate Salary
  MODE function(s) or Category involved: SERVICE MANAGEMENT/Administration—Billing & Accounting.
  Data Elements and Unit of Measurement: The sum of all employees yearly salaries (measure 1).$. The total number of employees (measure 2).
  Formula: Measure 1/Measure 2.
  Metric objective and additional comments: This metric measures how costly the staff employed are in the company. It would be very interesting to know the salary structure too, in order to better assess the indirect costs, since the costs associated to downtime and end-users are directly linked to the salary of the end-users concerned.

Support Cost Ratio

FP1-C: Support Costs per FTE
  MODE function(s) or Categoryinvolved: SERVICEMANAGEMENT/Administration—Billing & Accounting, Help Desk and/Quality Management—Training.
  Data Elements and Unit of Measurement: The total cost of support desk—see TCO "Support category," $\Sigma(CD31+ \ldots +CD35)$ (measure 1) . . . $. The total number of hours a user works on average per year (measure 2).
  Formula: Measure 1/Measure 2.
  Metric objective and additional comments: The point in measuring this cost on a per user basis is to take into account the potential changes in the organization: in case of great changes, the aggregate support desk cost may be misleading.
  Its objective is to provide a benchmarking device and an estimating guideline, but it can also be used to determine the effectiveness of efforts to reduce the costs or improve the efficiency of the support devices. Ideally, increases of the costs in this area should result in cost decreases in other areas, especially in the other support desk metrics.

Budget Management and Repartition

Budget Management

FP2-A: Cost Variance from Total Approved Budget
  MODE function(s) or Category involved: SERVICE MANAGEMENT/Administration—Billing & Accounting.
  Data Elements & Unit of Measurement: Actual TCO for the previous financial year (measure 1)—compute the sum of all costs related $\Sigma(CD1+ \ldots +CD44)$ . . . $. Budgeted TCO for the previous financial year (measure 2) . . . $.
  Formula: Measure 1−Measure 2/Measure 2.
  Metric objective and additional comments: This metric measures the effectiveness of management of TCO budgets, showing the variance from total approved budget. It is obtained by dividing the actual TCO minus the budgeted TCO by the budgeted TCO for the last financial year.
  Ideally, the actual cost should not go over the budgeted cost, and should not be more than 5% less than the budgeted cost (otherwise the budget would be badly managed).

Ongoing Costs Ratios
  This metric is actually an aggregation of several metrics, each being a ratio between different areas of the ongoing costs. The areas considered are support, systems management, change and upgrades, and indirect costs.

FP2-B: Support to Systems Management Ratio
  MODE function(s) or Category involved: SERVICE MANAGEMENT/Administration—Billing & Accounting, Help Desk and IQuality Management—Training, SYSTEMS MANAGEMENT.
  Data Elements and Unit of Measurement: Systems Management Costs (measure 1)—sum of all the costs related $\Sigma(CD16+ \ldots +CD25)$ . . . $. Support Costs (measure 2)—sum of all the costs related $\Sigma(CD31+ \ldots +CD35)$ . . . $.
  Formula: Measure 2/Measure 1*100%.
  Metric objective and additional comments. This ratio is an indicator for the rate of reactive to proactive budgeting. It also provides a benchmarking device. A trade-off has to be found between support and systems management.

FP2-C: Changes & Upgrades to Systems Management Ratio
  MODE function(s) or Category involved: MANAGING CHANGE. SYSTEMS MANAGEMENT.
  Data Elements and Unit of Measurement. Systems Management Costs (measure 1)—sum of all the costs related $\Sigma(CD16+ \ldots +CD25)$ . . . $. Changes & Upgrades (measure 2)—sum of the costs related $\Sigma(CD26+ \ldots +CD30)$.
  Formula: Measure 2/Measure 1*100%.
  Metric objective and additional comments. The importance of change and upgrade cost either reflect a bad planning or a firm policy that encourages frequent changes. The higher the rate is, the shorter the system's life span could be.

FP2-D. Indirect Costs to Direct Costs Ratio
  MODE function(s) or Category involved: SERVICE MANAGEMENT/Administration—Billing & Accounting. SYSTEMS MANAGEMENT/Failure control—Fault Management. SERVICE PLANNINGS/Service Management Planning—Training Planning.
  Data Elements and Unit of Measurement. Direct Costs (measure 1)—the sum of all costs related $\Sigma(CD16+ \ldots +CD39)$ . . . $. Indirect Costs (measure 2)—the sum of all costs related $\Sigma(CD40+ \ldots +CD44)$ . . . $.
  Formula: Measure 2/Measure 1*100%.
  Metric objective and additional comments. This ratio provides a benchmarking device for the cost estimations. There is a great point in reducing the ratio between the indirect costs and the total of direct costs, as direct costs are more easily measured and thus predictable.
  As the indirect costs are depending strongly on the performance of the two last related MODE functions, this rate indicates also how well downtime and peer support can be avoided.

FP2-E: Ongoing to Base Cost Ratio
  MODE function(s) or Category involved: SERVICE MANAGEMENT/Administration—Billing & Accounting. SYSTEMS PLANNINGS/MODE Strategic Planning
  Data Elements and Unit of Measurement. The Ongoing costs (measure 1) the sum of costs related $\Sigma(CD16+ \ldots +CD44)$ . . . $. The Base Costs (measure 2)—the sum of all costs related $\Sigma(CD1+ \ldots +CD15)$.$ Formula: Measure 1/Measure 2.

Metric objective and additional comments. This ratio allows to give an overview of the manageability and the complexity of an organization and the reliability of the technology and materials used. Depending on the life cycle of the system-the longer the better—it can be useful to have a small ratio.

Labor Costs Ratios

Again this metric is an aggregation of two metrics that intend to define the importance of the labor costs for the TCO as well as outsourcing trends.

FP2-F: Ratio of External to Internal Labor Costs

MODE function(s) or Category involved: SER VICE MANA GEMENT/Administration—Billing & Accounting and Contract Management.

Data Elements and Unit of Measurement. The Internal labor costs (measure 1) . . . $. The External labor costs (measure 2) . . . $.

Formula: Measure 2/Measure 1.

Metric objective and additional comments. As there are many metrics gathering both internal and external labor costs, it is not possible to reference metrics in order to computer this ratio. To compute it, it is assumed that the external labor costs are made up by both service contracts and contractors, and the sum of all these external labor costs are divided by all the internal labor costs. This ratio can be used to compare similar industry companies to determine industry trends in the way that some IT operations are outsourced. Sources such as Gartner Group provide information about outsourcing trends that can be used for benchmarking.

FP2-G: Ratio of Labor Costs to Other Costs

MODE function(s) of Category involved SERVICE MANAGEMENT/Administration—Billing & Accounting and SERVICE PLANNING/MODE Strategic Planning Data Elements & Unit of Measurement: 1) The Internal labor costs (measure 1) . . . $; 2) The External labor costs (measure 2) . . . $; and 3) The TCO for the last fiscal year (measure 3) . . . $.

Formula: (Measure 1+Measure 2) (Measure 3−Measure 1−Measure 2)

Metric Objective & Additional Comments. This ratio allows to detect if a technology improvement is needed, e.g. in the systems management field where monitoring and asset management can be automated. The results of the previous metric allows to determine the overall labor costs. For each cost element used to calculate the total TCO, the labor costs are indicated.

Ability to Operate Effectively and Efficiently the IT Operations and Systems Infrastructure (OEE)

The metrics in this area measure the performance of the business, focusing on system and operations quality, availability, and efficiency.

Quality

System's Reliability

OEE1-A: Number of Faults per User

MODE function(s) or Category involved: SERVICEMANAGEMENT/Quality—Quality. SYSTEMS MANAGEMENT/Failure control—Fault Management.

Data Elements and Unit of Measurement. The total number of incidents presented Tier 2 service Desk (measure 1). The total number of users (measure 2).

Formula: Measure 1/Measure 2.

Metric objective and additional comments. This metric measures the reliability of the technology implemented within the system. It is obtained by dividing the total number of incidents presented to Tier 2 service Desk by the total number of users of the whole systems during the past year. The higher this rate is, the less reliable is the technology used, and this could dramatically increase the costs associated with troubleshooting and repair.

System's Performance Rating

Those two aggregated metrics measure the system global performance and security.

OEE1-B: System's Performance Demand

MODE function(s) or Category involved: SERVICE MANAGEMENT/Production control—Production Scheduling.

Data Elements and Unit of Measurement: System's performance demand rating. Rate from 1 to 5.

Formula: No formula needed.

Metric objective and additional comments. This metric evaluates the global systems performance required by company business needs. The systems overall performance will be rated from 1 to 5, according to both technology efficiency (bandwidth available, file transfer speed, storage capacity) and fault tolerance and recovery (e.g., banks are very sensitive to downtime); basic technology and great fault tolerance; medium technology and great fault tolerance; medium technology and little fault tolerance; high technology and little fault tolerance; high technology and no fault tolerance.

OEE1-C: Physical and Logical Security Rating

MODE function(s) or Category involved: SYSTEMS MANAGEMENT/Monitoring—Physical Site Management and/Security Management Data Elements and Unit of Measurement: Physical and logical security rating . . . Rate from 1 to 5.

Formula: No formula needed.

Metric objective and additional comments. This metric evaluates the performance of the system in terms of security. The rating, going from 1 to 5, allows to indicate how important security is to the company, and then to assess the budget that could be spent on this area. For a given rate and according to the industry sector, benchmarks concerning budgets allocated to security may be available; system not secured; system poorly secured; system globally secured; system well secured; and system highly secured.

Availability

Network Availability

OEE-2A. Downtime Rate

MODE function(s) or Category involved: SER VICE MANAGEMENT/Quality Management and SYSTEMS MANAGEMENT/Failure control.

Data Elements and Unit of Measurement: The total network downtime (measure 1) . . . Hours; and The total number of hours a user works on average per year (measure 2) . . . Hours.

Formula: Measure 1/Measure 2

Metric objective and additional comments. This metric measures unavailability of the network, either due to planned interruptions, or to technology failures during the past year. Included in downtime is time a user waits for a problem to be resolved. The productivity loss should be taken into account as an indirect cost when setting the TCO budget, and it is important to notice that the support team's efficiency can dramatically decrease downtime.

Call Rates

This metric measures both the call relogging rate and abandonment rate at the Help Desk.

OEE2-B: Call Relogging Rate

MODE function(s) or Category involved: SERVICEMANAGEMENT/Quality Management and Help Desk Data Elements & Unit of Measurement: The number of calls that have been relogged by the Help Desk (measure 1). The total number of calls presented to the Help Desk (measure 2).

Formula: Measure 1/Measure 2

Metric objective and additional comments: This measurement, obtained by dividing the total number of relogged calls by the total number of calls presented to the Help Desk during the past year, check the availability of Help Desk people. A high percentage value for this metric indicates a poor success rate at resolving the underlying causes of problems.

OEE2-C: Call Abandonment Rate

MODE function(s) or Category involved: SERVICE MANAGEMENT/Quality Management and Help Desk.

Data Elements and Unit of Measurement: The total number of calls abandoned prior to closure (measure 1). The total number of calls presented to the Help Desk (measure 2).

Formula: Measure 1/Measure 2.

Metric objective and additional comments. This rate assesses the capability of the Help Desk to handle the received calls. In case of a high rate here, the end user downtime or peer/self support could increase, which results in a productivity loss. The higher the result for this metric the lower the ability of IT Operations to provide a fault resolution service; on the other hand a low value for this metric indicates a sufficient call taking capacity for the Service Desk.

Efficiency

Average response and resolution time.

These two metrics correspond to two consecutive steps in the resolution of a problem: first reporting, and then solving.

OEE3-A: Average Response Time

MODE function(s) or Category involved: SERVICE MANAGEMENT/Quality Management and Failure Control.

Data Elements and Unit of Measurement: The time it has taken to the support organization to respond to all incidents or problems (measure 1)—see in the Monitoring section of Systems Management . . . Hours. The Number of incident/problems tallied (measure 2).

Formula: Measure 1/Measure 2.

Metric objective and additional comments: The average response time metric determines the average time it takes the support organization to respond to an incident or problem. Normally, response time is defined as the time from the support organization first being aware of the incident or problem to the time at which the first action is taken (usually informing or giving status to users). It may be divided into further metrics based on the criticality of the requests (low, medium, high, critical).

OEE3-B: Average Resolution Time

MODE function(s) or Category involved: SERVICEMANAGEMENT/Quality Management and Failure Control.

Data Elements and Unit of Measurement. The time it has taken to the support organization to resolve problems as soon as requests were reported (measure 1)—see LAN/WAN troubleshooting & repair . . . Hours. Number of Incident/problems tallied (measure 2) . . . Hours.

Formula: Measure 1/Measure 2.

Metric objective and additional comments. The average resolution time is the measure of the time from an incident or request being reported to the time at which it is resolved. One can distinguish the "incident" and "request" categories: an incident is an occurrence-system error or malfunction-that requires assistance from the support organization, whereas a request refers to an action that a user asks to be performed that is usually related to network/workstation administration or software/hardware changes. Again further subdivision of the metric can be considered according to the defined criticality of the incident or request.

It is interesting to compare these metrics in order to assess the support organization's efficiency, and define the SLAs.

Help Desk Call Handling Rate & Staffing Ratio

These two correlated metrics measure the efficiency of the Help Desk staff.

OEE3-C. Help Desk Call Handling Rate

MODE function(s) or Category involved: SERVICE MANAGEMENT/Quality Management and Help Desk.

Data Elements and Unit of Measurement:

The number of calls presented to the Help Desk (measure 1) . . . None;

The total number of Help Desk Tier I staff (measure 2) . . . None

The average number of days worked by Help Desk Tier I staff (measure 3) . . . None.

Formula: Measure 1/Measure 2/Measure 3

Metric objective and additional comments. By dividing the total number of calls received by the Help Desk first line support staff by the average total number of Tier I support staff and by the average number of days worked during the past year, one can determine the productivity rate of the Tier I Help Desk staff.

OEE3-D. Help Desk Staffing Ratio

MODE function(s) or Category involved: SERVICE MANAGEMENT/Help Desk.

Data Elements and Unit of Measurement: The total number of Help Desk Tier I staff (measure 1) . . . The total number of users (measure 2).

Formula: Measure 2/Measure 1

Metric objective and additional comments. By dividing the total number of end users by the number of Help Desk personnel one have a good indication of the effectiveness of the Help Desk.

The two metrics (OEE3-C and OEE3-D) are correlated, because if the percentage associated to one metric increases, the other percentage associated to the second metric should also increase. Nevertheless, by multiplying those two rates, the number of calls that are presented to the Help Desk per employee is obtained, which is another interesting metric.

Desktop Services Delivery

OEE3-E: Average Time to Deliver a PC to Desk
  MODE function(s) or Category involved: MANAGING CHANGE/Implementing—Procurement.
  Data Elements and Unit of Measurement: The aggregate time to deliver all PCs accepted during the previous year (measure 1). Days. The number of PCs ordered during the last year (measure 2).
  Formula: Measure 1/Measure 2.
  Metric objective and additional comments: This metric measures the average time to deliver desktop services, from the order to the end of the installation, including the delivery and configuration. It allows to determine the flexibility of the system and its ability to administrate the users.

SLAs Management
This metric measures both the rate of ongoing systems operations covered by SLAs as the actual performance of these operations against the SLAs.

OEE3-F. SLA's Operations Coverage Ratio
  MODE function(s) or Category involved: SERVICE MANAGEMENT/SLA Management.
  Data Elements and Unit of Measurement: The number of Operations that are covered by SLAs (measure 1). The total number of Operations (measure 2) . . . None.
  Formula: Measure 1/Measure 2*100%
  Metric objective and additional comments: This metric shows how the operations are covered by SLAs. According to best practices, the SLAs should cover 100% of Operations to ensure that services rendered are according to requirements and any discrepancies can be easily identified and rectified as needed.

OEE3-G: Operations Performance against SLA's
  MODE function(s) or Category involved: SERVICE MANAGEMENT/SLA Management—Reporting and Quality Management—Quality Management
  Data Elements and Unit of Measurement: The total number of Operations Performance Measures that are covered by SLAs (measure 1). The number of Operations Performance Measures that fail to meet SLAs requirements (measure 2).
  Formula: Measure 2/Measure 1*100%
  Metric objective and additional comments. The result allows to show the performance of the system compared to the established targets. The SLAs can thus be corrected if necessary, and/or the systems performance improved.

Infrastructure and Evolution Perspective (IEP)
This area looks at the scalability of the infrastructure and at how sustainable the performances are likely to be in the future.

Adaptability
  System's Scalability
  This measure rates the upgradeability of the system's technology from 1 to 5, depending on the different technologic features of the system, gives the number of different platforms operated and the system's like span to assess the system's flexibility.

1EP1-A: System's Upgradability and Life Span
  MODE function(s) or Category involved: MANAGING CHANGE/Controlling—Asset Management and SERVICE PLANNING/MODE Strategic Planning.
  Data Elements and Unit of Measurement: The number of platforms operated. The systems life span.
  Formula: No formula is required. The metric is a rating from 1 to 5 that results from the values of the measures above.
  Metric objective and additional comments. This rating allows to evaluate the system's complexity, scalability, and durability. (1=not scalable, short life span; 2=little scalable, short to medium life span; 3=scalable but complex, medium life span; 4=scalable and not very complex, medium to long life span; and 5=very scalable, long life span).

WAN Bandwidth Utilization
This metric measures the percentage of bandwidth used.

IEP1-B: WAN Bandwidth Utilization
  MODE function(s) or Category involved: SYSTEMS MANAGEMENT/Monitoring—Performance Management.
  Data Elements and Unit of Measurement: The bandwidth that is used (measure 1) . . . Mb. The total available bandwidth (measure 2) . . . Mb.
  Formula: Measure 1/Measure 2*100%
  Metric objective and additional comments: Bandwidth utilization is to be measured at a peak time with utilization duration greater than five minutes.
  In addition, the percentage of time that use falls between a specified range is also measured, the objective could be to determine if the WAN bandwidth utilization is within a certain range and if it is not, the extent and frequency with which it is out of range. This also allows to see the supportable traffic increase on the network.
  NB: Information about bandwidth utilization is usually given as part of standard reports from WAN providers.

Training

IEP1-C: Average Training Hours Delivered per FTE
  MODE function(s) or Category involved: SERVICE MANAGEMENT/Quality Management—Training.
  Data Elements and Unit of Measurement: The aggregate number of training hours delivered last year (measure 1) . . . Hours; The total number of hours a user works on average per year (measure 2) . . . None.
  Formula: Measure 1/Measure 2.
  Metric objective and additional comments. This metric measures the capability of the human resources to train people. As a result, a more highly trained staff is likely to be more flexible as everyone is then more likely to fulfill a variety of roles.

Change

IEP1-D: Average Time to Implement a Change
  MODE function(s) or Category involved: MANAGING CHANGE
  Data Elements and Unit of Measurement: The aggregate time that it took to the company to implement registered changes (measure 1) and The number of changes that have been implemented (measure 2) . . . None.
  Formula: Measure 1/Measure 2.
  Metric objective and additional comments. This measure indicates how long it takes in average to the company to carry change related projects. It provides a good benchmark for the potential changes that were foreseen.

Future Requirements and Growth
Planning

This metric measures the length of planning horizon in current long term operational plan. It is crucial to have access to this data in order to assess the effectiveness of the organization.

IEP2-A: Length of Planning Horizon
  MODE function(s) or Category involved: SERVICE PLANNING/MODE Strategic Planning.
  Data Elements and Unit of Measurement: Length of planning horizon in current long term operation plan . . . Years.
  Formula: None
  Metric objective and additional comments. In general the longer the length of IT Operations planning horizon the more effective that organization is going to be at predicting future demand. However, some caution should be applied as any detailed planning is unlikely to be feasible beyond a year planning horizon and even more generalized planning is likely to become less useful beyond 3 years. An IT Operations function that has horizon of 3 years or more, can be considered 'capable' in terms of this metric.

Growth Perspective

This metric is an aggregation of three separate metrics that tend to indicate the organization's orientations.

IEP2-B: End-user Staff Growth or Attrition
  MODE function(s) or Category involved: SERVICE PLANNING MODE Strategic Planning
  Data Elements and Unit of Measurement: The number of new joiners expected (measure 1). The number of persons that are expected to leave the company (measure 2). The total current number of employees (measure 3).
  Formula: (Measure 1+Measure 2)/Measure 3
  Metric objective and additional comments. The end-user staff growth or attrition rate has consequences on all the metrics that deal with labor costs, so it is interesting to predict the changes in order to assess the overall new budget.

IEP2-C: Budget Estimation
  MODE function(s) or Category involved: SERVICE PLANNING/Service Management Planning—Service Pricing and Costing.
  Data Elements and Unit of Measurement: The expected TCO budget for next year (measure 1). The current TCO budget (measure 2).
  Formula: (Measure 1−Measure 2)/Measure 1
  Metric objective and additional comments. The variance of the next budget compared to the current budget is related to an overall planning of operations, changes, and technology orientations. As a result, many metrics will be affected by the budget orientations that are reflected in this metric.

IEP2-D: Performance Expectations
  MODE function(s) or Category involved: SERVICE PLANNING/Managing Change Planning
  Data Elements and Unit of Measurement: The performance improvement expectation (measure 1) . . . Rate from 1 to 5.
  Formula: Measure 1
  Metric objective and additional comments: This metric indicates how the performances of the system should improve: no improvement needed; little improvement needed; medium improvements needed; great improvements needed; overall critical improvements required.

Appraisal Metrics Interrelationships

The relationships that exist between the different appraisal metrics defined in the previous section are described in more detail below. The information can be used as a starting point in the interpretation of both cost data and appraisal metrics before beginning the benchmark study.

Interrelationships Overview

The relationships between the metrics can be summarized in a symmetric matrix featuring different types of relations:

One metric can influence another metric, i.e., its value has direct consequences on the another metric's value.

Example: The average Corporate salary of a Company influences the Support Costs per FTE, since the Support Costs are labor costs that are at least partly performed by employees of the company.

One metric can be similarly influenced by another metric, i.e., its value is partly determined by another metric's value.

Two metrics can have a complementary relationship, i.e., their variations should be correlated.

Example: If the FTE downtime rate increases, the Cost variance from total approved budget should also increase since FTE downtime begets Indirect costs that are not predicable. In this case, we have a kind of "indirect influence" between the first and the second metric.

Two metrics can have a trade-off relationship, i.e., if the value of one metric increases, the value of the other should tend to decrease.

Example: There is a trade-off between the Help Desk staffing ratio and the Call relogging rate. If the Help Desk support staff increases, more calls could be handled and thus the Call relogging rate would decrease.

Interrelationships Profiles

For each metric, the related metrics as well as the nature of their relationships is provided in the Tables below. All the metrics except those related to Infrastructure and Evolution Perspective, i.e., metrics IEP2-B, C and D, have relationships with other metrics, and often there are cross-categories relationships.

One has to be careful when considering the metrics associated with time, because a "complementary relationship" can either tend to increase or decrease its value. For those types of metrics, the influence of other metrics on the time and the inverse of the time that indicates the performance for this type of metric merits close analysis.

TABLE 1

FP1-A
TCO Budget Ratio

| Related Metrics | Nature of the Relationship to FP1-A |
| --- | --- |
| FP1-B Average corporate salary | Complementary relationship |
| OEE1-B System's performance demand | Complementary relationship |
| OEE1-C Physical and logical security rating | Complementary relationship |
| IEP1-C Average training | Influences FP1-A |
| IEP2-A Length of planning horizon | Influences FP1-A |

TABLE 2

FP1-B
Average Corporate Salary

| Related Metrics | Nature of the Relationship to FP1-B |
|---|---|
| FP1-A TCO budget ration | Complementary relationship |
| FP1-C Support costs per FTE | Is influenced by FP1-B |
| FP2-E Ongoing to base costs ratios | Complementary relationship |
| FP2-G Ratio of labor costs to other costs | Is influenced by FP1-B |

TABLE 3

FP1-C
Support Costs per FTE

| Related Metrics | Nature of the Relationship to FP1-C |
|---|---|
| FP1-B Average corporate salary | Influences FP1-C |
| FP2-B Support to Systems Management ration | Complementary relationship |
| FP2-E Ongoing to Base costs ratio | Complementary relationship |
| FP2-G Ratio of labor costs to other costs | Complementary relationship |
| OEE1-A Number of faults per FTE | Trade-off relationship |
| OEE1-B System's performance demand | Complementary relationship |
| OEE2-B Call relogging rate | Trade-off relationship |
| OEE2-C Call abandonment rate | Trade-off relationship |
| OEE3-A Average response time | Trade-off relationship |
| OEE3-B Average resolution time | Trade-off relationship |
| OEE3-D Help Desk staffing ratio | Influences FP1-C |
| IEP1-C Average training hours per FTE | Influences FP1-C |

TABLE 4

FP2-A
Cost Variance from Total Approved Budget

| Related Metrics | Nature of the Relationship to FP2-A |
|---|---|
| FP2-D Indirect to direct costs ration | Complementary relationship |
| OEE2-A FTE downtime rate | Complementary relationship |

TABLE 5

FP2-B
Support to Systems Management ration

| Related Metrics | Nature of the Relationship to FP2-B |
|---|---|
| FP1-C Support costs per FTE | Complementary relationship |

TABLE 6

FP2-C
Changes & Upgrades to Systems Management

| Related Metrics | Nature of the Relationship to FP2-C |
|---|---|
| FP2-F Ratio of external to internal costs | Complementary relationship |
| IEP1-A System's upgradeability and life span | Trade-off relationship |
| IEP1-D Average time to implement a change | Trade-off relationship |

TABLE 7

FP2-D
Indirect to Direct Cost Ratio

| Related Metrics | Nature of the Relationship to FP2-D |
|---|---|
| FP2-A Cost variance from total approved budget | Complementary relationship |
| OEE2-A FTE downtime rate | Influences FP2-D |

TABLE 8

FP2-E
Ongoing to Base Costs Ratio

| Related Metrics | Nautre of the Relationship to FP2-E |
|---|---|
| FP1-B Average Corporate Salary | Complementary relationship |
| FP1-C Support costs per FTE | Complementary relationship |
| FP2-G Ratio of labor costs to other costs | Complementary relationship |
| OEE2-A FTE downtime rate | Influences FP2-E |

TABLE 9

FP2-F
Ratio of External to Internal Costs

| Related Metrics | Nature of the Relationship to FP2-F |
|---|---|
| FP2-C Change & Upgrades to Systems Management Ratio | Complementary relationship |
| OEE3-F SLA's Operations coverage ration | Complementary relationship |

TABLE 10

FP2-G
Ratio of Labor Costs to Other Costs

| Related Metrics | Nature of the Relationship to FP2-G |
|---|---|
| FP1-B Average corporate Salary | Influences FP2-G |
| FP1-C Support costs per FTE | Complementary relationship |
| FP2-E Ongoing to base costs ratio | Complementary relationship |

TABLE 11

OEE1-A
Number of Faults per FTE

| Related Metrics | Nature of the Relationship to OEE1-A |
|---|---|
| FP1-C Support Costs per FTE | Trade-off relationship |
| OEE1-B System's Performance Demand | Trade-off relationship |
| OEE2-A FTE downtime rate | Is influenced by OEE1-A |
| OEE2-B Call relogging rate | Complementary relationship |
| OEE2-C Call abandonment rate | Complementary relationship |
| OEE3-C Help Desk call handling rate | Is influenced by OEE1-A |
| IEP1-B WAN bandwidth utilisation | Influences OEE1-A |

TABLE 12

OEE1-B
Number of Faults per FTE

| Related Metrics | Nature of the Relationship to OEE1-B |
|---|---|
| FP1-A TCO budget ratio | Complementary relationship |
| FP1-C Support costs per FTE | Complementary relationship |
| OEE1-A Number of faults per FTE | Trade-off relationship |
| OEE2-A FTE downtime rate | Trade-off relationship |
| OEE2-B Call relogging rate | Trade-off relationship |
| OEE2-C Call abandonment rate | Trade-off relationship |
| OEE3-A Average response time | Complementary relationship |
| OEE3-B Average resolution time | Complementary relationship |
| OEE3-E Average time to deliver a PC to desk | Complementary relationship |
| OEE3-F SLA's Operations coverage ratio | Complementary relationship |
| OEE3-G Operations performance against SLAs | Complementary relationship |

TABLE 13

OEE1-C
Physical and Logical Security Rating

| Related Metrics | Nature of the Relationship to OEE1-C |
|---|---|
| FP1-A TCO Budget Ration | Complementary relationship |

TABLE 14

OEE2-A
FTE Downtime Rate

| Related Metrics | Nature of the Relationship to OEE 2-A |
|---|---|
| FP2-A Cost variance from total approved budget | Complementary relationship |
| FP2-D Indirect to direct costs | Is influenced by OEE2-A |
| FP2-E Ongoing to base costs ratio | Is influenced by OEE2-A |
| OEE1-A Number of faults per FTE | Influences OEE2-A |
| OEE1-B System's performance demand | Trade-off relationship |
| OEE2-B Call relogging rate | Complementary relationship |
| OEE2-C Call abandonment rate | Complementary relationship |
| OEE3-A Average response time | Complementary relationship |
| OEE3-B Average resolution time | Complementary relationship |
| IEP1-B WAN bandwidth utilization | Complementary relationship |
| IEP1-C Average training hours per FTE | Trade-off relationship |

TABLE 15

OEE2-B
Call Relogging Rate

| Related Metrics | Nature of the Relationship to OEE2-B |
|---|---|
| FP1-C Support Costs per FTE | Trade-off relationship |
| OEE1-A Number of faults per user | Complementary relationship |
| OEE1-B System's performance demand | Trade-off relationship |
| OEE2-A FTE downtime rate | Complementary relationship |
| OEE3-A Average response time | Complementary relationship |

TABLE 15-continued

OEE2-B
Call Relogging Rate

| Related Metrics | Nature of the Relationship to OEE2-B |
|---|---|
| OEE3-C Help Desk call handling rate | Complementary relationship |
| OEE3-D Help Desk staffing ratio | Trade-off relationship |

TABLE 16

OEE2-C
Call Abandonment Rate

| Related Metrics | Nature of the Relationship to OEE2-C |
|---|---|
| FP1-C Support costs per FTE | Trade-off relationship |
| OEE1-A Number of faults per user | Complementary relationship |
| OEE1-B System's performance demand | Trade-off relationship |
| OEE2-A FTE downtime rate | Complementary relationship |
| OEE3-A Average response time | Complementary relationship |
| OEE3-C Help Desk call handling rate | Complementary relationship |
| OEE3-D Help Desk staffing ratio | Trade-off relationship |

TABLE 17

OEE3-A
Average Response Time

| Related Metrics | Nature of the Relationship to OEE3-A |
|---|---|
| FP1-C Support costs per FTE | Trade-off relationship |
| OEE1-B System's performance demand | Complementary relationship to 1/OEE3-A |
| OEE2-A FTE downtime rate | Complementary relationship |
| OEE2-B Call relogging rate | Complementary relationship |
| OEE2-C Call abandonment rate | Complementary relationship |
| OEE3-F SLA's operation coverage ration | Complementary relationship to 1/OEE3-A |

TABLE 18

OEE3-B
Average Resolution Time

| Related Metrics | Nature of the Relationship to OEE3-B |
|---|---|
| FP1-C Support costs per FTE | Trade-off relationship |
| OEE1-B System's performance demand | Complementary relationship to 1/OEE3-A |
| OEE2-A FTE downtime rate | Complementary relationship |
| OEE3-F SLA's operation coverage ratio | Complementary relationship to OEE3-A |

TABLE 19

OEE3-C
Help Desk Call Handling Rate

| Related Metrics | Nature of the Relationship to OEE3-C |
|---|---|
| OEE1-A Number of faults per FTE | Influences OEE3-C |
| OEE2-B Call relogging rate | Complementary relationship |
| OEE2-C Call abandonment rate | Complementary relationship |

TABLE 19-continued

OEE3-C
Help Desk Call Handling Rate

| Related Metrics | Nature of the Relationship to OEE3-C |
|---|---|
| OEE3-G Operations performance against SLA's | Complementary relationship |

TABLE 20

OEE3-D
Help Desk Staffing Ratio

| Related Metrics | Nature of the Relationship to OEE3-D |
|---|---|
| FP1-C Support costs per FTE | Is influenced by OEE3-D |
| OEE2-B Call relogging Rate | Trade-off relationship |
| OEE2-C Call abandonment rate | Trade-off relationship |

TABLE 21

OEE3-E
Average Time to Deliver a PC to Desk

| Related Metrics | Nature of the Relationship to OEE3-E |
|---|---|
| OEE1-B System's performance demand | Complementary relationship to 1/OEE3-E |
| IEP1-D Average time to implement a change | Complementary relationship |

TABLE 22

OEE3-F
SLA's Operations Coverage Ratio

| Related Metrics | Nature of the Relationship to OEE3-F |
|---|---|
| FP1-A TCO budget ratio | Complementary relationship |
| FP2-F Ratio of external to internal Costs | Complementary relationship |
| OEE1-B System's performance Demand | Complementary relationship |
| OEE3-A Average response time | Complementary relationship to 1/OEE3-F |
| OEE3-B Average resolution time | Complementary relationship to 1/OEE3-F |

TABLE 23

OEE3-G
Operation Performance against SLAs

| Related Metrics | Nature of the Relationship to OEE3-G |
|---|---|
| OEE1-B System's performance Demand | Complementary relationship to 1/OEE3-G |
| OEE3-C Help Desk Call Handling Rate | Complementary relationship |

TABLE 24

IEP1-A
System's Upgradeability & Life Span

| Related Metrics | Nature of the Relationship to IEP1-A |
|---|---|
| None | |

TABLE 25

IEP1-B
WAN Bandwidth Utilisation

| Related Metrics | Nature of the Relationship to IEP1-B |
|---|---|
| None | |

TABLE 26

IEP1-C
Average Time Hours per FTE

| Related Metrics | Nature of the Relationship to IEP1-C |
|---|---|
| None | |

TABLE 27

IEP1-D
Average Time to Implement a Change

| Related Metrics | Nature of the Relationship to IEP1-D |
|---|---|
| FP2-C Change & Upgrade to systems management ratio | Trade-off relationship |
| OEE3-E Average time to deliver a Pc to desk | Complementary relationship |
| IEP1-C Average training hours per FTE | Trade-off relationship |

TABLE 28

IEP2-A
Length of Planning Horizon

| Related Metrics | Nature of the Relationship to IEP2-A |
|---|---|
| FP1-A TCO budget ratio | Is influenced by IEP2-A |

TABLE 29

IEP2-B
End-user Staff Growth or Attrition

| Related Metrics | Nature of the Relationship to IEP2-B |
|---|---|
| None | |

TABLE 30

IEP2-C
Budget Estimation

| Related Metrics | Nature of the Relationship to IEP2-C |
|---|---|
| None | |

TABLE 31

IEP2-D Budget Estimation

| Related Metrics | Nature of the Relationship to IEP2-D |
|---|---|
| None | |

TABLE 32

IEP2-D Budget Estimation

| Related Metrics | Nature of the Relationship to IEP2-D |
|---|---|
| None | |

The value for the appraisal metrics is in comparing them in time with previous calculated metrics for a system, or in comparing them with predetermined benchmarks. For some metrics there are no given benchmarks, but rather expected value ranges, which allows to include values for different industry types in the same table. Of course, other benchmark values may be used for specific industries, and for specific experiences with certain IT organization configurations. In Table 33 below, some exemplary benchmarks are provided.

TABLE 33

| Metric Id | Metric Title | Expected value range |
|---|---|---|
| FP1-A | TCO budget ratio | N/A |
| FP1-B | Average corporate salary | N/A |
| FP1-C | Support desk costs per FTE | N/A |
| FP2-A | Cost variance from total approved budget | −5% to 5% |
| FP2-B | Support to Systems Management ratio | N/A |
| FP2-C | Changes/Upgrades to Systems Management ratio | N/A |
| FP2-D | Indirect costs to direct costs ratio | N/A |
| FP2-E | Ongoing to Base Costs ratio | N/A |
| FP2-F | Ratio of labor costs to other costs | N/A |
| FP2-G | Ratio of internal to external labor costs | N/A |
| OEE1-A | Number of faults per FTE | 0 to 6 faults/user |
| OEE1-B | System's performance demand | N/A |
| OEE1-C | Physical and logical security rating | 4 to 5 |
| OEE2-A | End user downtime rate | 0 to 0.05% |
| OEE2-B | Call relogging rate | 100% |
| OEE2-C | Call abandonment rate | 3.5 to 4.5% |
| OEE3-A | Average response time | Less than 1 hour |
| OEE3-B | Average resolution time | Less than 24 hours |
| OEE3-C | Help Desk call handling rate | 30 calls/day |
| OEE3-D | Help Desk staffing ratio | 100 users/operator |
| OEE3-E | Average time to deliver a PC to desk | 10 to 15 days |
| OEE3-F | SLA's operations coverage ratio | 100% |
| OEE3-G | Operations performance against SLA's | 98% |
| IEP1-A | System's upgradeability and life span | 4 to 5 rating |
| IEP1-B | WAN bandwidth utilisation | 20% to 40% |
| IEP1-C | Average training Hours delivered per FTE | 120 hours |
| IEP1-D | Average time to implement a change | N/A |
| IEP2-A | Length of planning horizon | N/A |
| IEP2-B | End-user staff growth or attrition | N/A |
| IEP2-C | Budget estimation | N/A |
| IEP2-D | Performance expectations | N/A |

While this invention has been shown and described in connection with the embodiments described, it is apparent that certain changes and modifications, in addition to those mentioned above may be made from the basic features of this invention. Many types of organizations may benefit from the use of this invention, e.g., any organization wishing use an information technology system. In addition, there are many different types of computer systems, and computer software and hardware, that may be utilized in practicing the invention, and the invention is not limited to the examples given above. Accordingly, it is the intention of the applicants to protect all variations and modifications within the valid scope of the present invention. It is intended that the invention be defined by the following claims, including all equivalents.

What is claimed is:

1. A method for determining a cost for each user of an information technology system, the method comprising:
    obtaining base costs;
    obtaining ongoing direct costs;
    obtaining ongoing indirect costs;
    gathering information relating to user profiles and organizational characteristics;
    inputting said costs and information into a computer and calculating by the computer the cost for each user and a plurality of appraisal metrics; wherein the appraisal metrics include (i) financial perspective metrics determined from the obtained costs, (ii) operational effectiveness and efficiency metrics determined from the gathered information, and (iii) infrastructure and evolution perspective metrics determined from the gathered information;
    identifying interrelationship profiles between the financial perspective metrics and related operational effectiveness and efficiency metrics and related infrastructure and evolution perspective metrics;
    assigning each of said appraisal metrics to correspond to an information technology organizational function category, wherein the organizational function category comprises service management; systems management; service planning and change management;
    selecting an information technology organizational function category; and
    reporting both the financial and non-financial appraisal metrics corresponding only to the selected category.

2. The method of claim 1, wherein said base costs include design costs, acquisition costs, and installation costs, which costs are used by the computer to determine the appraisal metrics.

3. The method of claim 1, wherein said ongoing direct costs include production control costs, monitoring costs, security management and failure control costs, changes in upgrade costs, support costs, and operational costs, which costs are used by the computer to determine the appraisal metrics.

4. The method of claim 1, wherein said ongoing indirect costs include end-user costs and downtime costs.

5. The method of claim 1, wherein at least one of said costs correspond to at least one information technology function, and the cost for each user is broken down according to said information technology function.

6. The method of claim 1, further comprising assigning the operational effectiveness and efficiency metrics into categories representative of (1) quality, (2) availability and (3) efficiency of the information technology system.

7. The method of claim 6, wherein:
(1) the operational effectiveness and efficiency metrics representative of quality include (a) faults per user, (b) performance demand, and (c) security ratings;
(2) the operational effectiveness and efficiency metrics representative of availability include (a) downtime rate, (b) call relogging rate, and (c) call abandonment rate; and
(3) the operational effectiveness and efficiency metrics representative of efficiency include (a) response time, (b) resolution time, (c) help desk call handling rate, (d) help desk staffing ratio, (e) PC delivery time, (f) SLA coverage ratio and (g) SLA performance failure rate; and
wherein the method further comprises comparing each of said operational effectiveness and efficiency metrics with predetermined benchmarks or with metrics determined for the system in prior periods.

8. The method of claim 1, further comprising assigning the infrastructure and evolution perspective metrics into categories representative of (1) adaptability and (2) growth of the information technology system.

9. The method of claim 8, wherein:
(1) the infrastructure and evolution perspective metrics representative of adaptability include (a) system upgradeability and life span, (b) network bandwidth utilization, (c) training time, and (d) average time for change implementation; and
(2) the infrastructure and evolution perspective metrics representative of growth include (a) length of planning horizon, (b) user growth, (c) budget growth, and (d) performance improvement expectation; and
wherein the method further comprises comparing each of said infrastructure and evolution perspective metrics with predetermined benchmarks or with metrics determined for the system in prior periods.

10. The method of claim 1, further comprising identifying a relationship in said profile as a complementary relationship, a trade-off relationship or an influential relationship.

11. A method for analyzing costs associated with supporting an information technology system, the method comprising:

obtaining cost information;
obtaining system characteristics;
calculating by a computer appraisal metrics based on said cost information and said system characteristics; wherein the appraisal metrics include (i) financial perspective metrics determined from the obtained costs, (ii) operational effectiveness and efficiency metrics determined from the gathered information, and (iii) infrastructure and evolution perspective metrics determined from the gathered information;
defining interrelationship profiles between the financial perspective metrics and related operational effectiveness and efficiency metrics and related infrastructure and evolution perspective metrics;
assigning each of said appraisal metrics to correspond to an information technology organizational function category, wherein the organizational function category comprises service management; systems management; service planning and change management;
comparing said appraisal metrics with established benchmarks; and
providing the appraisal metrics and cost information in separate reports for the corresponding organizational function categories.

12. The method of claim 11, wherein said cost information includes base costs, ongoing direct costs and ongoing indirect costs, which costs are used to calculate the appraisal metrics.

13. The method of claim 12, wherein the base costs include design costs, acquisition costs, and installation costs, which costs are used to calculate the appraisal metrics.

14. The method of claim 12, wherein the ongoing direct costs include production control costs, monitoring costs, security management and failure control costs, changes in upgrade costs, support costs, and operational costs, which costs are used to calculate the appraisal metrics.

15. The method of claim 12, wherein the ongoing indirect costs include end-user costs and downtime costs, which costs are used to calculate the appraisal metrics.

16. The method of claim 11, wherein said metrics are used to determine cost improvement opportunities through best practices implementation for said category.

17. The method of claim 1, further comprising identifying a relationship in said profile as a complementary relationship, a trade-off relationship or an influential relationship.

18. The method of claim 11, further comprising identifying a relationship in said profile as a complementary relationship, a trade-off relationship or an influential relationship.

* * * * *